Feb. 4, 1958  R. M. McDONALD  2,822,443
RESISTANCE LOWERING GENERATOR BOOSTER
Filed Oct. 31, 1956
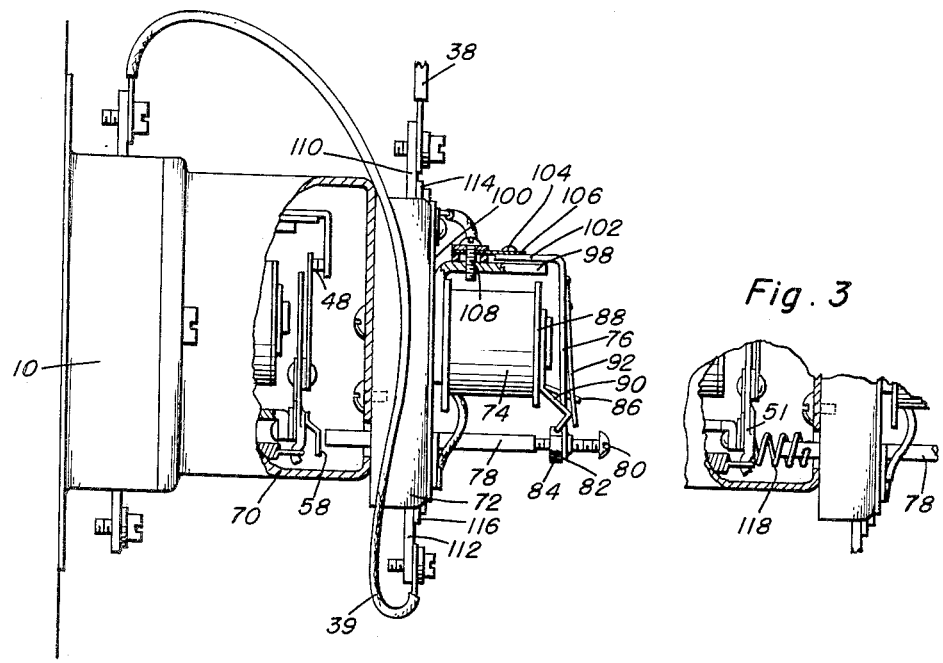
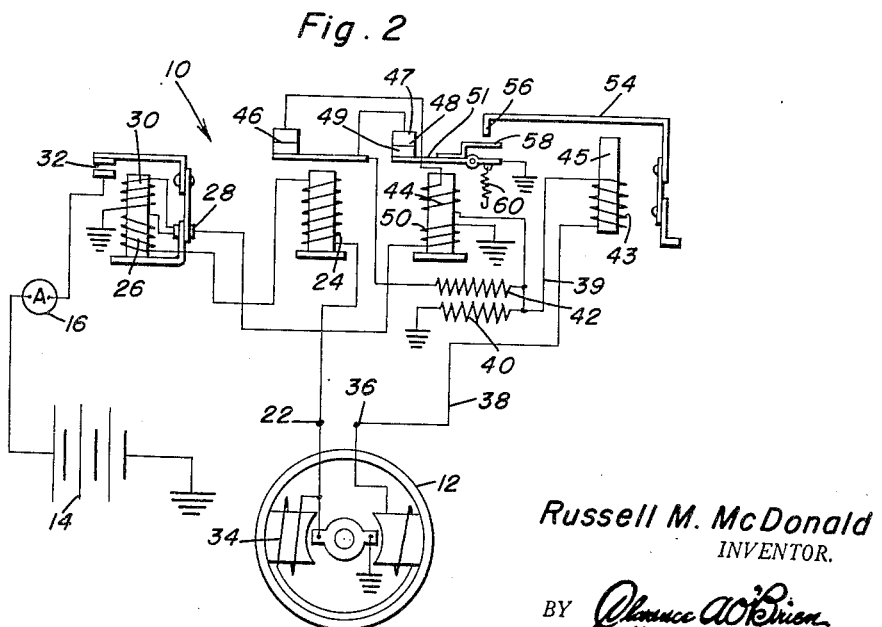
Russell M. McDonald
INVENTOR.

United States Patent Office 2,822,443
Patented Feb. 4, 1958

2,822,443
RESISTANCE LOWERING GENERATOR BOOSTER

Russell M. McDonald, Conway, Ark.

Application October 31, 1956, Serial No. 619,561

4 Claims. (Cl. 200—87)

This invention relates to a voltage booster for a conventional voltage regulator for reducing the resistance in the contacts of the voltage regulator.

The primary object of the present invention resides in the provision of a device for causing a generator to charge reasonably high at lower generator armature speeds and automatically lower the generator charging rate at a higher generator armature speed. This is accomplished by lowering and increasing the resistance of the generator field circuit. Battery voltage and generator armature speed determine the value of a generator field circuit operating with the proper voltage regulator.

In the operation of internal combustion engines it is customary to provide a generator driven by the internal combustion engine for providing charging current to a storage battery which in turn supplies energy to various current consuming devices associated with the internal combustion engine as in automobiles and the like.

Variable resistance is encountered in the contacts of the voltage regulator due to the fact that the contacts do not engage each other in a tight manner but vibrate at a speed which varies in direct relation to the R. P. M. of the generator armature which in turn is controlled by the speed of the motor driving same. The present invention provides means for urging the contacts together more tightly at low speeds, but not at high speeds, so as to decrease the voltage drop across the contacts and thus increase the voltage and hence the output of the generator at low speed only.

These, together with the various ancillary objects and features of the invention reside in the provision of this resistance lowering generator booster, preferred embodiments of which have been illustrated in the accompanying drawings, by way of example only, wherein:

Figure 1 is an elevational view of a conventional voltage regulator illustrating the device comprising the present invention installed thereon with parts of the invention and of the voltage regulator being shown in section for greater clarity;

Figure 2 is a schematic diagram of the various electrical components of the invention and with the solenoid actuated means for reducing resistance in the contacts mounted alongside of the voltage regulator rather than thereabove as shown in Figure 1; and Figure 3 is a sectional detail view of a portion of a modified form of the invention.

With continuing reference to the drawings wherein like reference numerals designate similar parts throughout the various views, reference numeral 10 generally designates a conventional voltage regulator which is provided for controlling current flow from a generator 12 to a battery 14. As is conventional an ammeter 16 is provided for indicating the status of the charging system.

The battery 14 is charged from the generator 12 which is connected to the battery 14 through its output terminal 22 which is connected to a series regulator coil 24 and is connected in a series circuit connection to a series cut-out coil 26. The coils 24 and 26 are connected in series to a general output terminal 28. A shunt coil 30 for the cut-out operates the cut-out contact 32 to control the connection between the general terminal 28 and the battery 14.

The generator 12 is provided with a field coil 34 which is connected to the field terminal 36 from a conductor 38 which extends to the field control system of the voltage regulator including impedances 40 and 42 connected in parallel relation between the terminal 36 and ground.

Connected in series circuit with the parallel impedances 40 and 42 is the coil 43 of a solenoid 45 which form important elements of the invention. Terminal 36 is connected to the control 44 of a regulator control device with the coil 34 being connected in series circuit relation to the contacts 46 of the series regulator coil 24 and the contacts 48 associated with the coil 44. The contacts 48 include a fixed contact 47 and a movable contact 49 mounted on an armature 51. The contacts 46 and 48 serve to connect the winding 44 between the terminal 36 and the ground. The impedance 40 is permanently connected to the ground so as to prevent open circuit of the field winding during operation of the regulator while the parallel impedance 42 is connected through the contacts 48 to ground so that the operation of the coil 44 together with the coil 50 will control the contact 48 and thus control the operativeness of the impedance 42. As is usual the shunt coil 50 is connected between the general output terminal 28 of the generator through the coil 50 to ground.

In the form of the invention as is shown in Figure 2, the solenoid is mounted alongside the various electromagnetic means for controlling the contacts 32, 46 and 48. The solenoid 45 controls an armature 54 which in turn includes a plunger 56 adapted to engage a leaf spring 58 mounted on the armature 51. The armature 51 is normally urged by means of a spring 60 to a position where the contacts 47 and 49 are closed but the function of the plunger 56 is to engage the spring and further and more tightly depress the spring 58 and hence the armature 51 into a position where the contacts 47 and 49 are very tightly closed. When the contacts 47 and 49 are very tightly closed, there is a decrease in the resistance in the contact assembly 48 and hence there is less voltage drop thereacross resulting in an optimum operation of the regulator and hence greater generator output.

In the form of the invention as is shown in Figure 1, mounted on the casing 70 of the voltage regulator 10 is a base 72 which carries a solenoid 74 similar to the solenoid 45. The solenoid 74 controls an armature 76 carrying a plunger 78. The plunger 78 includes a threaded member 80 in the form of a screw or the like which is threadedly adjustably engaged in a threaded aperture in an extended portion 82 of the armature 76. The extended portion 82 of the armature 76 may have a threaded nut-like portion 84 affixed thereto through which the adjusting screw 80 extends. The plunger 78 may be formed of any suitable material such as synthetic plastic material or the like and is adapted to engage the spring 58 as in the form of the invention shown in Figure 2. A stop 86 is provided for the armature 76 which overlies a portion of the armature 76 and limits the position of the armature 76 with the plunger 78 away from the spring 58. Carried on the insulated top plate 88 of the solenoid 74 is an angulated member 90 which may be bent so as to adjust the amount of force needed to be exerted by the solenoid 74 to urge the armature and hence the plunger 78 into a lowered position. This is because there is provided a spring 92 fixed to the armature 76 which engages the angulated member 90. By bending the angulated member 90 the position of the spring can be adjusted.

Another means for adjusting the armature 76 is provided in the mounting arrangement for the armature 76 itself with respect to the solenoid 74. It is noted that the solenoid 74 is mounted on an L-shaped plate 98 insulated by a plate 100 from the base 72. The armature 76 has a bend portion 102 which has riveted thereto as at 104 an adjustable mounting plate 106 which is adapted to be engaged by a pair of screws 108 which extend through a slot in the plate 106 to provide the desired adjustment. Suitable terminals 110 and 112 are provided to which the conductors 38 and 39 are connected. These terminals may be insulated as at 114 and 116.

In lieu of the spring 58, the plunger 78 may have a coil spring 118 attached thereto as shown in Figure 3 which coil spring 118 directly engages the armature 51.

In use, when the solenoid 45 is excited, it will draw the armature 54 so that the plunger 56 will engage the spring 58 to hold the contacts 47 and 49 more tightly together thus reducing the voltage drop lost because of the resistance in the contacts.

The invention operates to cause the generator to charge reasonably high at lower generator armature speeds and automatically lower the generator charging rate at higher generator armature speeds. The generator field resistance is decreased by exerting a limited amount of pressure on the spring 58 and in turn causing pressure to be applied between the voltage regulator contacts 47 and 49. This decreases the resistance in the generator field circuit 34 and in turn causes the generator to charge reasonably high at lower generator armature speeds. This is accomplished by decreasing a part of the resistance between the voltage regulator contacts 47 and 49. The remaining resistance between the voltage regulator contacts 47 and 49 will increase as the generator armature speed increases. This lowers the value of the generator field circuit 34 and allows the plunger 56 to disengage the spring 58. This in turn allows the resistance to increase to normal between the voltage regulator contacts 47 and 49. Naturally the generator output at higher speeds of the generator armature is decreased.

When the speed of the generator armature is decreased the resistance between the voltage regulator contacts 47 and 49 decreases and in turn increases the value of the generator circuit 34. Coil winding 43 being in series circuit relation with the generator field circuit 34 will cause an increase in the magnetic core 45 sufficient to attract the armature 54 causing the plunger 56 to engage spring 58 causing less resistance between the voltage regulating contacts 49 and in turn causing a higher generator output at lower speeds.

When the generator armature speed is sufficiently high, a higher resistance has occurred due to increased vibration of the voltage regulator contacts 47 and 49. This in turn lowers the generator field circuit 34 and the core winding 43 being in series circuit relation to the generator field circuit 34 and causes the magnetic strength core 45 to weaken and allow the armature 54 to move away from the core 45 and in turn release plunger 56 from spring 58. This causes more resistance in the generator field circuit and the generator resumes its normal charging rate until a lower generator armature speed is reached.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for reducing the resistance in contacts of a voltage regulator controlling current flow from a generator to a battery in a battery charging system, said voltage regulator including an armature carrying a movable contact, said movable contact being engageable with a fixed contact, electromagnetic means controlling said armature, said device comprising a solenoid connected in series circuit with said electromagnetic means, said solenoid actuating a plunger, and a spring positioned between said plunger and said armature so that upon actuation of said plunger said armature will be resiliently urged into a position with said movable contact tightly engaging said fixed contact, and means for adjusting said plunger relative to said armature.

2. A device for reducing the resistance in contacts of a voltage regulator controlling current flow from a generator to a battery in a battery charging system, said voltage regulator including an armature carrying a movable contact, said movable contact being engageable with a fixed contact, electromagnetic means controlling said armature, said device comprising a solenoid connected in series circuit with said electromagnetic means, said solenoid actuating a plunger, and a spring positioned between said plunger and said armature so that upon actuation of said plunger said armature will be resiliently urged into a position with said movable contact tightly engaging said fixed contact, said spring being a leaf spring secured to said armature, and means for adjusting said plunger relative to said armature.

3. A device for reducing the resistance in contacts of a voltage regulator controlling current flow from a generator to a battery in a battery charging system, said voltage regulator including an armature carrying a movable contact, said movable contact being engageable with a fixed contact, electromagnetic means controlling said armature, said device comprising a solenoid connected in series circuit with said electromagnetic means, said solenoid actuating a plunger, and a spring positioned between said plunger and said armature so that upon actuation of said plunger said armature will be resiliently urged into a position with said movable contact tightly engaging said fixed contact, said spring being a coil spring having one end thereof secured to said plunger.

4. A device for reducing the resistance in contacts of a voltage regulator controlling current flow from a generator to a battery in a battery charging system, said voltage regulator including an armature carrying a movable contact, said movable contact being engageable with a fixed contact, electromagnetic means controlling said armature, said device comprising a solenoid connected in series circuit with said electromagnetic means, said solenoid actuating a plunger, and a spring positioned between said plunger and said armature so that upon actuation of said plunger said armature will be resiliently urged into a position with said movable contact tightly engaging said fixed contact, means for adjusting said plunger relative to said solenoid, and means for adjusting said plunger relative to said armature.

References Cited in the file of this patent
UNITED STATES PATENTS

| | | |
|---|---|---|
| 2,672,583 | Van Zale | Mar. 16, 1954 |
| 2,723,323 | Niemi | Nov. 8, 1955 |
| 2,736,857 | Klug | Feb. 28, 1956 |